US010664391B2

(12) United States Patent
Jang

(10) Patent No.: US 10,664,391 B2
(45) Date of Patent: May 26, 2020

(54) CONTROLLER AND OPERATING METHOD THEREOF

(71) Applicant: SK hynix Inc., Gyeonggi-do (KR)

(72) Inventor: Eun-Soo Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 43 days.

(21) Appl. No.: 16/000,402

(22) Filed: Jun. 5, 2018

(65) Prior Publication Data
US 2019/0121733 A1    Apr. 25, 2019

(30) Foreign Application Priority Data
Oct. 23, 2017  (KR) .......................... 10-2017-0137160

(51) Int. Cl.
  *G06F 12/00* (2006.01)
  *G06F 12/02* (2006.01)
  *G06F 3/06* (2006.01)
  *G06F 12/0882* (2016.01)
  *G06F 12/06* (2006.01)

(52) U.S. Cl.
  CPC .......... *G06F 12/0253* (2013.01); *G06F 3/065* (2013.01); *G06F 3/0608* (2013.01); *G06F 3/0673* (2013.01); *G06F 12/06* (2013.01); *G06F 12/0882* (2013.01)

(58) Field of Classification Search
  CPC .. G06F 12/0246; G06F 12/0253; G06F 12/06; G06F 12/0882; G06F 3/0608; G06F 3/065; G06F 3/0673
  See application file for complete search history.

(56) References Cited

U.S. PATENT DOCUMENTS

| 2016/0019142 A1* | 1/2016 | Lin ..................... G06F 12/0246 711/103 |
| 2016/0163381 A1* | 6/2016 | Lee ..................... G11C 11/5635 711/209 |
| 2016/0283369 A1* | 9/2016 | Hada .................. G06F 12/0253 |

FOREIGN PATENT DOCUMENTS

KR    1020160132204    11/2016

* cited by examiner

*Primary Examiner* — Shawn X Gu
(74) *Attorney, Agent, or Firm* — IP & T Group LLP

(57) ABSTRACT

A controller includes: a counter suitable for counting a number of valid pages in each of a plurality of blocks in a memory device as first parameter values; a block selector suitable for selecting one or more first candidate blocks, the first parameter value of each of which is within a predetermined range, and selecting a victim block among the one or more first candidate blocks; and a processor suitable for controlling the memory device to read valid data stored in the victim block and program the valid data into a target block in the memory device.

18 Claims, 12 Drawing Sheets

FIG. 7

Block_3 (730A)

| PAGE | Chunk 0 | Chunk 1 | Chunk 2 |
|---|---|---|---|
| 0 | Valid (730A_1) | Invalid (730A_2) | Valid (730A_3) |
| 1 | Valid (730A_4) | Invalid (730A_5) | Valid (730A_6) |
| 2 | Invalid (730A_7) | Valid (730A_8) | Valid (730A_9) |
| 3 | Valid (730A_10) | Invalid (730A_11) | Valid (730A_12) |
| 4 | Valid (730A_13) | Valid (730A_14) | Valid (730A_15) |

Block_4 (730B)

| PAGE | Chunk 0 | Chunk 1 | Chunk 2 |
|---|---|---|---|
| 0 | Valid (730B_1) | Valid (730B_2) | Valid (650B_3) |
| 1 | Invalid (730B_4) | Invalid (730B_5) | Invalid (730B_6) |
| 2 | Invalid (730B_7) | Valid (730B_8) | Valid (730B_9) |
| 3 | Valid (730B_10) | Valid (730B_11) | Valid (730B_12) |
| 4 | Valid (730B_13) | Valid (730B_14) | Valid (730B_15) |

Target (750)

| PAGE | Chunk 0 | Chunk 1 | Chunk 2 |
|---|---|---|---|
| 0 | Valid (750_1) | Valid (750_2) | Valid (750_3) |
| 1 | Valid (750_4) | Valid (750_5) | Valid (750_6) |
| 2 | Valid (750_7) | Valid (750_8) | Valid (750_9) |
| 3 | Valid (750_10) | Valid (750_11) | Dummy (750_12) |
| 4 | Erased (750_13) | Erased (750_14) | Erased (750_15) |

CONTROLLER AND OPERATING METHOD THEREOF

CROSS-REFERENCE TO RELATED APPLICATION(S)

The present application claims priority under 35 U.S.C. § 119(a) to Korean Patent Application No. 10-2017-0137160 filed on Oct. 23, 2017, the disclosure of which is incorporated herein by reference in its entirety.

BACKGROUND

1. Field

Various embodiments of the present invention relate to a controller. Particularly, such embodiments relate to a controller capable of efficiently performing a garbage collection operation, and an operating method thereof.

2. Description of the Related Art

The paradigm for computing environments is shifting towards ubiquitous computing, which allows users to use computer systems anytime and anywhere. As a result, the demand for portable electronic devices such as mobile phones, digital cameras, and laptop computers is increasing. These electronic devices generally include a memory system including a memory device as a data storage device. The data storage device may be used as a main memory unit or an auxiliary memory unit of a portable electronic device.

Since the data storage device including the memory device does not have a mechanical driving unit, it has excellent stability and durability, fast data access rate, and low power consumption. Non-limiting examples of the data storage device having such advantages include Universal Serial Bus (USB) memory devices, memory cards of diverse interfaces, Solid-State Drives (SSD), and the like.

SUMMARY

Various embodiments of the present invention are directed to a controller capable of efficiently performing a garbage collection operation, and an operating method thereof.

In accordance with an embodiment of the present invention, a controller may include a counter suitable for counting a number of valid pages in each of a plurality of blocks in a memory device as first parameter values; a block selector suitable for selecting one or more first candidate blocks, the first parameter value of each of which is within a predetermined range, and selecting a victim block among the one or more first candidate blocks; and a processor suitable for controlling the memory device to read valid data stored in the victim block and program the valid data into a target block in the memory device.

In accordance with an embodiment of the present invention, an operating method of a controller may include counting, using a counter, a number of valid pages in each of a plurality of blocks in a memory device as first parameter values; selecting, using a block selector, one or more first candidate blocks, the first parameter value of each of which is within a predetermined range, and selecting a victim block among the one or more first candidate blocks; and controlling the memory device, using a processor, to read valid data stored in the victim block and program the valid data into a target block of the memory device.

In accordance with an embodiment of the present invention, a memory system may include a memory device including a plurality of blocks; and a controller suitable for: determining a number of valid pages in each of the plurality of blocks as first parameters; selecting, among one or more first candidate blocks, the first parameter of each of which is within a predetermined range, a victim block; and controlling the memory device to read valid data stored in the victim block and program the valid data into a target block.

BRIEF DESCRIPTION OF THE DRAWINGS

FIG. 7 illustrates a garbage collection operation in accordance with an embodiment of the present invention.

DETAILED DESCRIPTION

Figure 1:
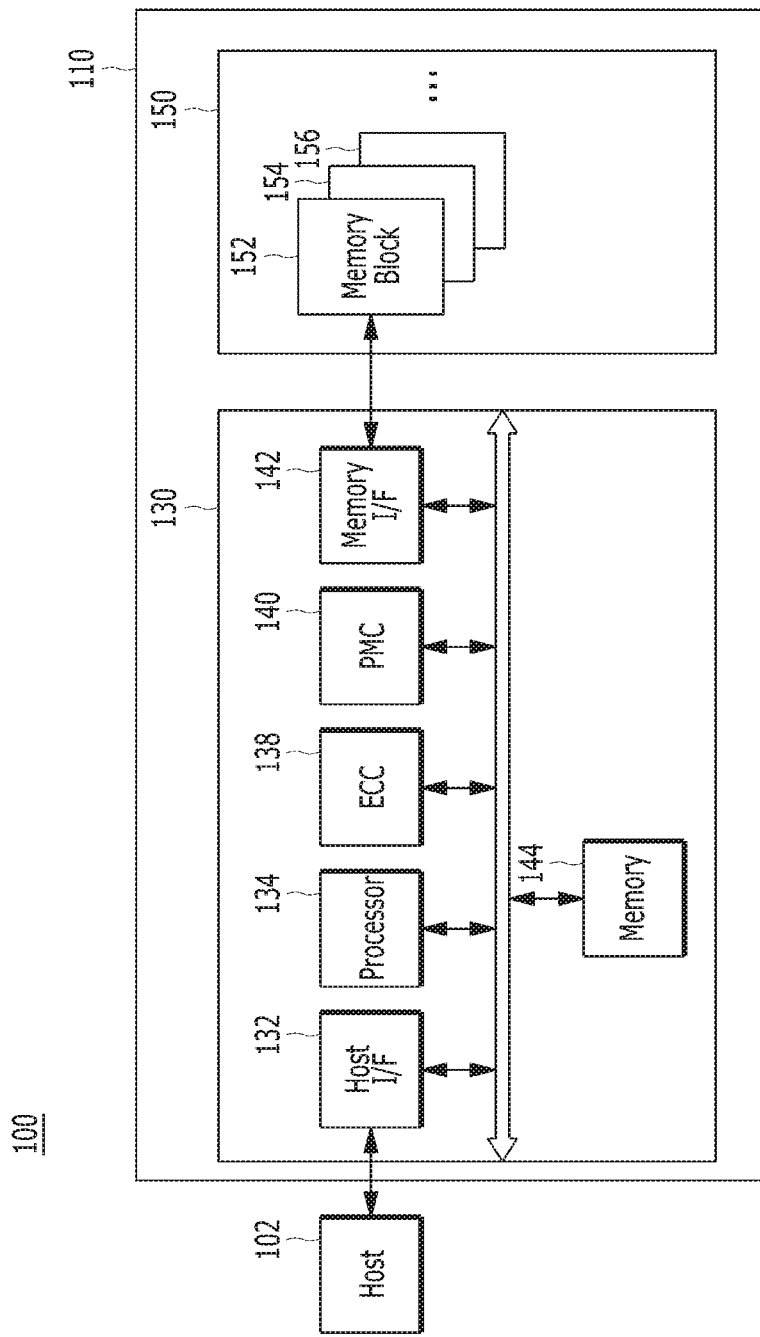
FIG. 1 is a block diagram illustrating a data processing system including a memory system, in accordance with an embodiment of the present invention.

Various embodiments of the present invention are described below in more detail with reference to the accompanying drawings. However, elements and features of the present invention may be configured or arranged differently than shown in the described and illustrated embodiments, as will be apparent to those skilled in the art in light of this disclosure. Thus, the present invention is not limited to the embodiments set forth herein. Rather, the described embodiments are provided so that this disclosure is thorough and complete and fully conveys the present invention to those skilled in the art to which this invention pertains. Moreover, reference to "an embodiment" does not necessarily mean only one embodiment, and different references to "an embodiment" are not necessarily to the same embodiment(s). Throughout the disclosure, like reference numerals refer to like parts throughout the various figures and embodiments of the present invention.

It will be understood that, although the terms "first", "second", "third", and so on may be used herein to identify various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the disclosed embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments and is not intended to limit the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer, or an electronic device such as a desktop computer, a game player, a TV, a projector, and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM), and/or a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in any of the various types of memory systems as exemplified above.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152, 154, 156 (hereinafter, referred to as "memory blocks 152 to 156"), each of which may include a plurality of pages. Each of the pages may include a plurality of memory cells to which a plurality of word lines (WL) are electrically coupled.

The controller 130 may control overall operations of the memory device 150, such as read, write, program and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface (I/F) 132, a processor 134, an error correction code (ECC) component 138, a power management circuit (PMC) 140, a memory device controller such as a memory interface (I/F) 142, and a memory 144 all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI), and integrated drive electronics (IDE).

The ECC component 138 may detect and correct errors in the data read from the memory device 150 during the read operation. The ECC component 138 may not correct error bits when the number of the error bits is greater than or equal to a threshold number of correctable error bits, and may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC component 138 may include all circuits, modules, systems or devices for the error correction operation.

The PMC 140 may provide and manage power for the controller 130.

The memory interface 142 may serve as a memory/storage interface between the controller 130 and the memory device 150 to allow the controller 130 to control the memory device 150 in response to a request from the host 102. The memory interface 142 may generate a control signal for the memory device 150 and process data to be provided to the memory device 150 under the control of the processor 134 when the memory device 150 is a flash memory and, in particular, a NAND flash memory.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be implemented with a volatile memory. For example, the memory 144 may be implemented with a static random access memory (SRAM) or a dynamic random access memory (DRAM). Although FIG. 1 exemplifies the memory 144 disposed within the controller 130, the present disclosure is not limited thereto. That is, the memory 144 may be disposed within or out of the controller 130. For instance, in an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

A FTL may perform an operation as an interface between the host 102 and the memory device 150. The host 102 may request the memory device 150 to perform write and read operations through the FTL.

The FTL may manage operations of address mapping, garbage collection, wear-leveling, and the like. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data into another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134, and may perform bad block management of the memory device 150. The management unit may find bad memory blocks included in the memory device 150, which blocks are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks seriously deteriorate the utilization efficiency of the memory device 150 having a 3D stack structure and the reliability of the memory system 100, and thus reliable bad block management is needed.

Figure 2:
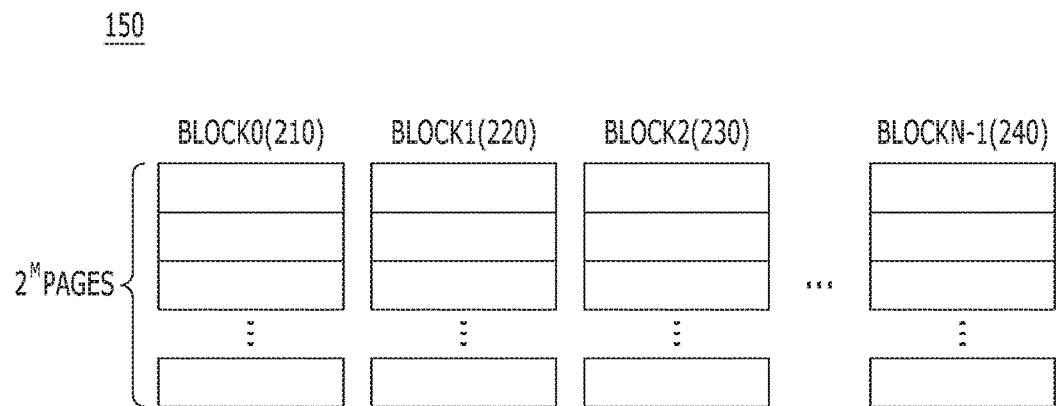
FIG. 2 is a schematic diagram illustrating an exemplary configuration of a memory device of the memory system shown in FIG. 1.

FIG. 2 is a schematic diagram illustrating the memory device 150.

Referring to FIG. 2, the memory device 150 may include a plurality of memory blocks 0 to N−1, e.g., a memory block 0 (BLK0) 210, a memory block 1 (BLK1) 220, a memory block 2 (BLK2) 230, and a memory block N−1 (BLKN−1) 240. Each of the memory blocks 210, 220, 230 and 240 may include a plurality of pages, for example $2^M$ pages, the number of which may vary according to circuit design. The memory device 150 may include a plurality of memory blocks, such as single level cell (SLC) memory blocks and multi-level cell (MLC) memory blocks, according to the number of bits which may be stored or expressed in each memory cell. The SLC memory block may include a plurality of pages which are implemented with memory cells, each capable of storing 1-bit data. The MLC memory block may include a plurality of pages which are implemented with memory cells, each capable of storing multi-bit data, for example, two or more-bit data. An MLC memory block including a plurality of pages which are implemented with memory cells that are each capable of storing 3-bit data may be defined as a triple level cell (TLC) memory block.

Figure 3:
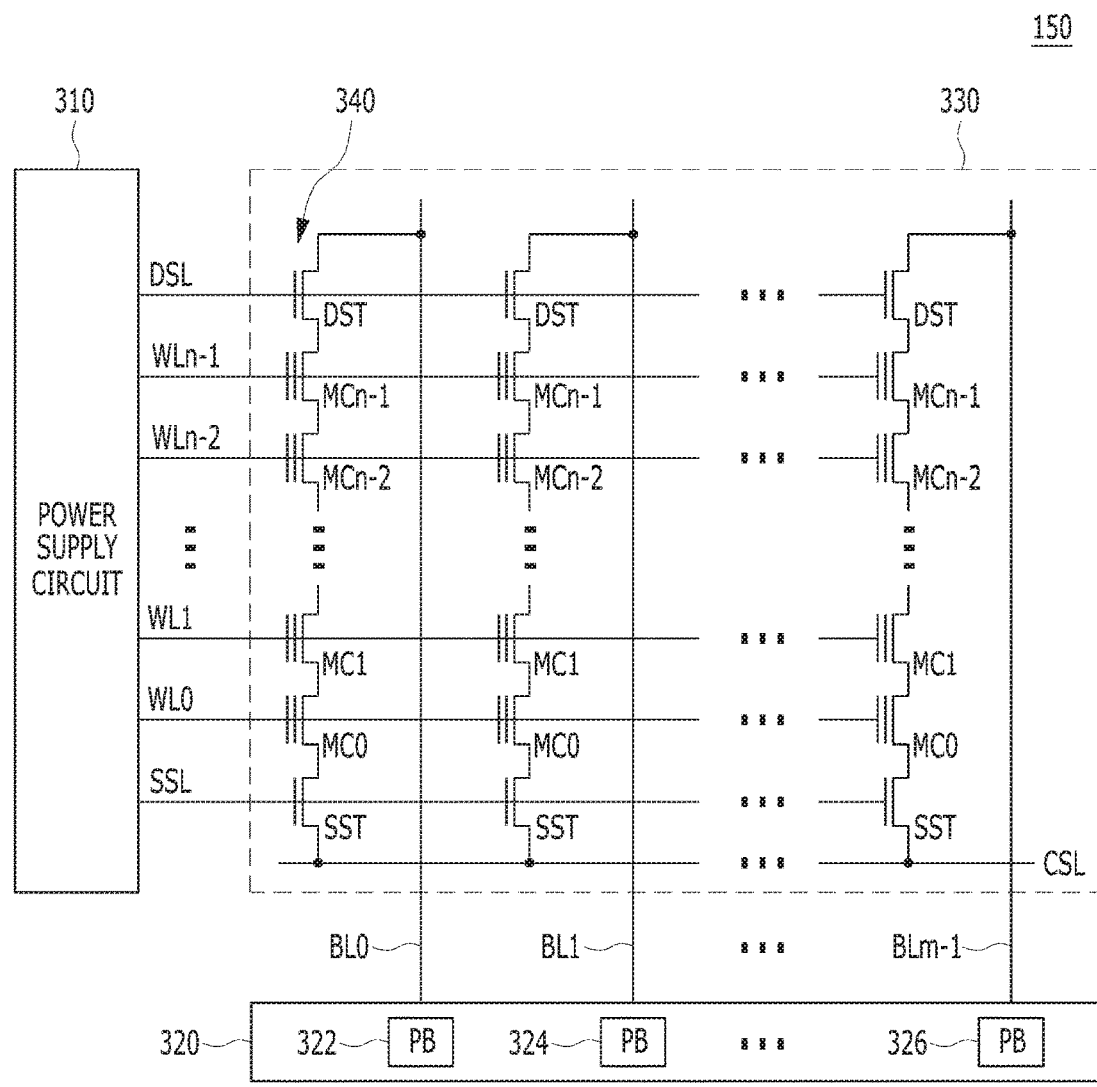
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 may correspond to any of the plurality of memory blocks 152 to 156.

Referring to FIG. 3, the memory block 330 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by multi-level cells (MLC)

each of which may store data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line. A plurality of word lines WL0 to WLn−1 may be electrically coupled in series between the source select line SSL and the drain select line DSL.

While FIG. 3 shows, as an example, the memory block 330 configured by NAND flash memory cells, it is to be noted that the memory block 330 is not limited to NAND flash memory. Memory block 330 may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply circuit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit and may serve as a sense amplifier or a write driver according to an operation mode. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
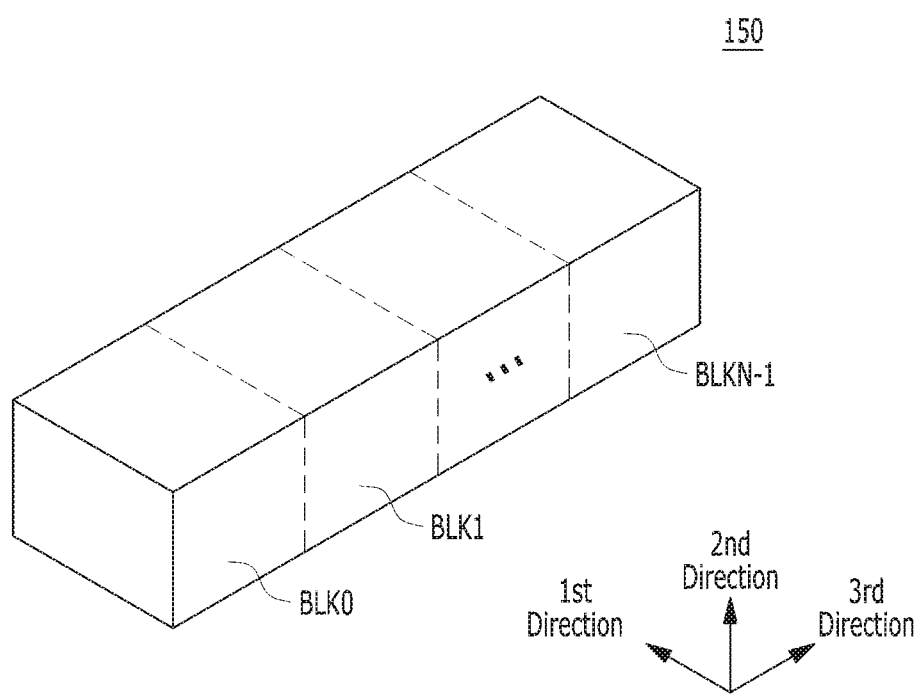
FIG. 4 is a schematic diagram illustrating an exemplary three-dimensional (3D) structure of the memory device shown in FIG. 2.

FIG. 4 is a schematic diagram illustrating a 3D structure of the memory device 150.

The memory device 150 may be embodied by a 2D or 3D memory device. As illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Referring to FIG. 1, the controller 130 may not actually remove but invalidate data stored in a physical address (hereinafter referred to as 'pages') which are previously mapped when a write request for the same logical address as the logical address corresponding to the physical address is received. If the invalidation process is repeated, the invalid pages may be accumulated. Then, the controller 130 may control the memory device 150 to select a victim block whose the number of the invalid pages are greater than or equal to a threshold value, copy valid data from the victim block and program the valid data into a target block which is a free block. The controller 130 may erase the remaining invalid data stored in the invalid pages in the victim block. This operation process is called garbage collection.

The present invention aims to provide a controller capable of efficiently performing the garbage collection operation by selecting the victim block based on a specific criterion, and an operating method of the controller. Embodiments of the present invention will be described with reference to FIGS. 5 to 8. For convenience of explanation, it is assumed that data stored in the invalid page is invalid data, and data stored in valid pages is valid data.

Figure 5:
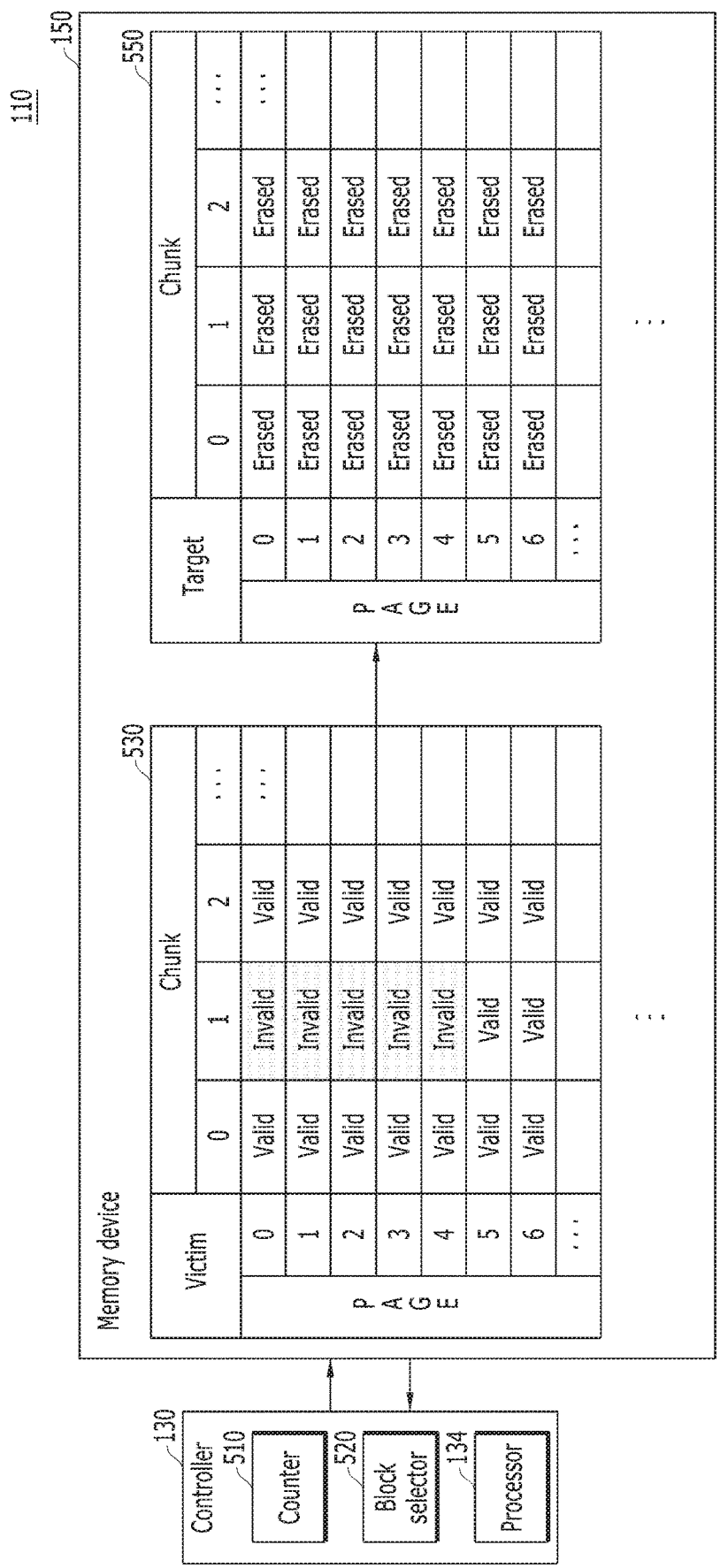
FIG. 5 illustrates a memory system in accordance with an embodiment of the present invention.

FIG. 5 illustrates a memory system 110 in accordance with an embodiment of the present invention.

As described above with reference to FIG. 1, the memory system 110 may include the controller 130 and the memory device 150.

The memory device 150 may include a plurality of memory blocks. The memory blocks may include a victim block 530 selected based on a predetermined criterion, and a target block 550 which is a free block. Each of the memory blocks may include a plurality of pages, and each of the pages may include a plurality of chunks. The controller 130 may further include a cache memory (not illustrated), a counter 510, and a block selector 520, in addition to the processor 134.

As described earlier, the processor 134 may control the memory device 150 so as to program or read data into or from the memory device 150. Further, the processor 134 may control the memory device 150 to perform the garbage collection operation. Specifically, the processor 134 may read valid data stored in the victim block 530, and control the memory device 150 to program the valid data into the target block 550.

Although not illustrated, the controller 130 may include the cache memory. The cache memory may be included in the memory 144 of FIG. 1 and may be configured separately.

When the processor 134 reads the valid data stored in the victim block 530, the read valid data may be temporarily stored in the cache memory. Subsequently, the processor 134 may control the memory device 150 to program the valid data stored in the cache memory into the target block 550.

The counter 510 may count the number of valid pages included in each of the memory blocks, or count or obtain another value indicative thereof, whenever the garbage collection operation is performed, which count or other value is referred to as a valid page count (VPC). Also, the counter 510 may count the number of times that valid data, which are stored in one or more candidate blocks whose VPC is within a predetermined range, are programmed on a page unit into the target block 550, or count or obtain another value indicative thereof, which count or other value is referred to as a data write count (WC). In addition, when the valid data of the victim block 530 are read in order to perform the garbage collection operation, the counter 510 may count the number of times that the valid data are sequentially read on a page unit, or count or obtain another value indicative thereof, which count or other value is referred to as a data read count (RC).

The block selector 520 may select the target block 550, and the victim block 530 based on the predetermined criterion. Specifically, the block selector 520 may select at least one block whose VPC is within a predetermined range as one or more first candidate blocks. For example, when the predetermined range is set to be within approximately 10% of a predetermined VPC of 50, the block selector 520 may select blocks whose VPC is 45 to 55 as the first candidate blocks. When the number of the first candidate blocks is one, the block selector 520 may select that first candidate block as a victim block, and the processor 134 may perform the garbage collection operation onto the selected first candidate block. When the number of the first candidate blocks is plural, the block selector 520 may select at least one block having a minimum WC as one or more second candidate blocks. When the number of the second candidate blocks is one, the block selector 520 may select that second candidate block as a victim block, and the processor 134 may perform the garbage collection operation onto the selected second candidate block. When the number of the second candidate blocks is plural, the block selector 520 may select at least one block having a minimum RC as one or more third candidate blocks. When the number of the third candidate blocks is one, the block selector 520 may select that third candidate block as a victim block, and the processor 134 may perform the garbage collection operation onto the selected third candidate block. When the number of the third candidate blocks is plural, the block selector 520 may select at least one block having a minimum VPC as one or more fourth candidate blocks. When the number of the fourth candidate blocks is one, the block selector 520 may select that fourth candidate block as a victim block, and the processor 134 may perform the garbage collection operation onto the selected fourth candidate block. When the number of the fourth candidate blocks is plural, the block selector 520 may select any block of the fourth candidate blocks as a victim block, and the processor 134 may perform the garbage collection operation onto the selected block.

Figure 6:
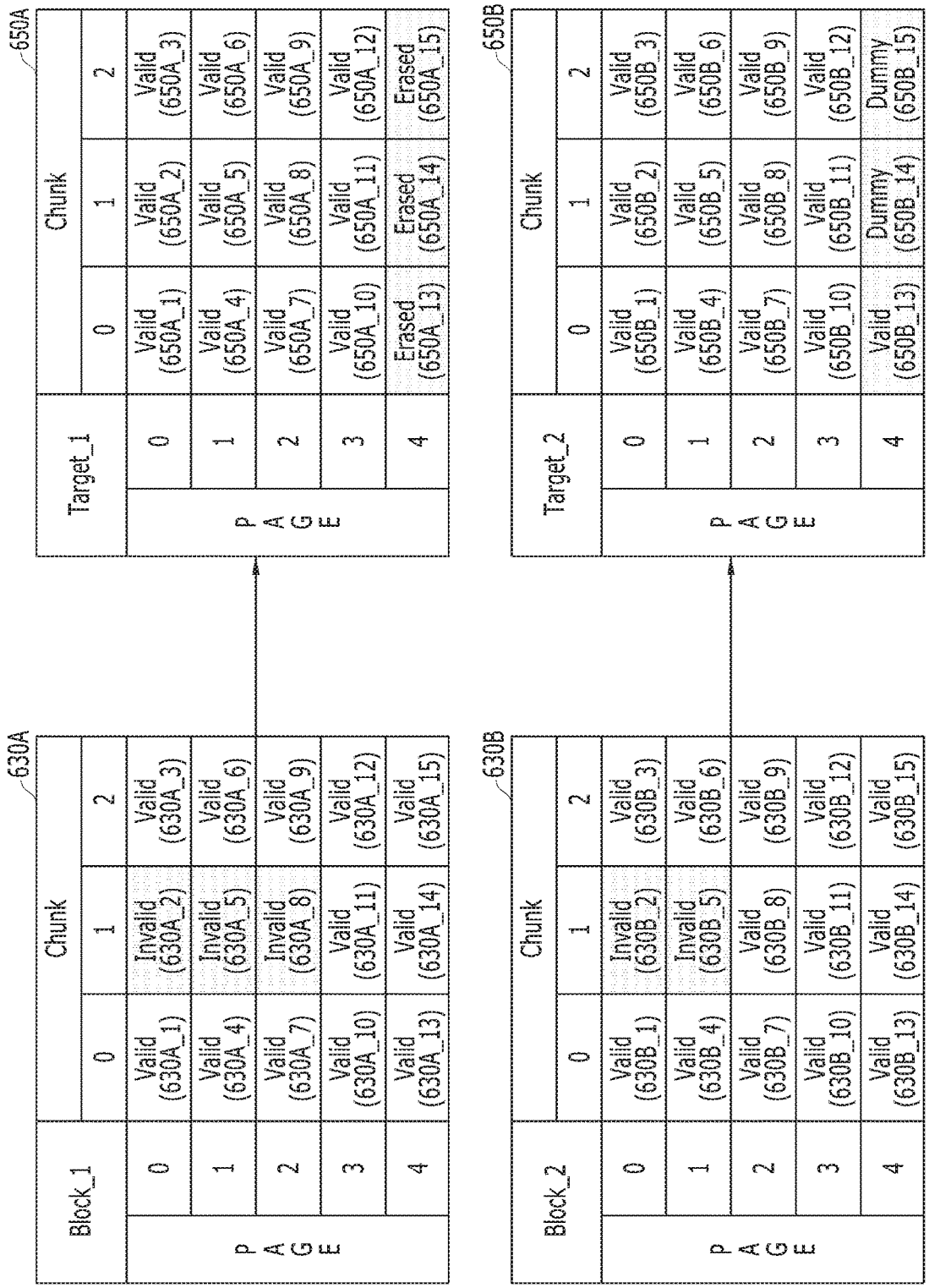
FIG. 6 illustrates a garbage collection operation in accordance with an embodiment of the present invention.

FIG. 6 illustrates a garbage collection operation in accordance with an embodiment of the present invention. Specifically, a method of counting a data write count (WC), which is a criterion for selecting a victim block, is illustrated in FIG. 6.

For example, as shown in FIG. 6, If the number of valid pages of a first block 630A is 12, a VPC of the first block 630A is 12, and if the number of valid pages of a second block 630B is 13, a VPC of the second block 630B is 13. For the sake of convenience, it is assumed that the first block 630A and the second block 630B are the first candidate blocks whose VPC that is set in advance is within the predetermined range as described above with reference with FIG. 5. Therefore, the block selector 520 may select a block having a smaller WC among the first block 630A and the second block 630B as a victim block.

The processor 134 of FIG. 5 may control the memory device 150 to copy valid data stored in the valid pages of the first block 630A and program the valid data into a first target block 650A. Accordingly, valid data stored in a zeroth chunk 630A_1 of a zeroth page of the first block 630A may be programmed into a zeroth chunk 650A_1 of a zeroth page of the first target block 650A. Invalid data stored in a first chunk 630A_2 of the zeroth page of the first block 630A may not be transferred to the first target block 650A. Valid data stored in a second chunk 630A_3 of the zeroth page of the first block 630A may be programmed into a first chunk 650A_2 of the zeroth page of the first target block 650A. In the same manner, valid data stored in each of a plurality of chunks 630A_4, 630A_6, 630A_7 and 630A_9 to 630A_15 of the first block 630A may be sequentially programmed into each of a plurality of chunks 650A_3 to 650A_12 of the first target block 650A. Accordingly, a plurality of valid data may be lastly programmed into a third page of the first target block 650A. As described earlier, since the program operation is performed on a page unit, the counter 510 may count the number of times that the valid data stored in the first block 630A are programmed into the first target block 650A as 4, which corresponds to pages 0 to 3. In other words, the counter 510 may count the WC of the first block 630A as 4.

The processor 134 may control the memory device 150 to copy valid data stored in the valid pages of the second block 630B and program the valid data into a second target block 650B. Accordingly, valid data stored in a zeroth chunk 630B_1 of a zeroth page of the second block 630B may be programmed into a zeroth chunk 650B_1 of a zeroth page of the second target block 650B. Invalid data stored in a first chunk 630B_2 of the zeroth page of the second block 630B may not be transferred to the second target block 650B. Valid data stored in a second chunk 630B_3 of the zeroth page of the second block 630B may be programmed into a first chunk 650B_2 of the zeroth page of the second target block 650B. In the same manner, valid data stored in each of a plurality of chunks 630B_4 and 630B_6 to 630B_15 of the second block 630B may be sequentially programmed into each of a plurality of chunks 650B_3 to 650B_13 of the second target block 650B. Since the VPC of the second block 6303 is 13, the processor 134 may control the memory device 150 to program the valid data up into a zeroth chunk 650B_13 of a fourth page of the second target block 650B. Since the program operation is performed on a page unit, the processor 134 may control to the memory device 150 to program dummy data into a first chunk 650B_14 and a second chunk 650B_15 of the fourth page of the second target block 6503. Accordingly, the counter 510 may count the number of times that the valid data stored in the second block 6303 are programmed into the second target block 650B as 5, which corresponds to pages 0 to 4. In other words, the counter 510 may count the WC of the second block 630B as 5.

When a plurality of first candidate blocks exist, the block selector 520 may select a block having a smaller WC among the first candidate blocks as a victim block. Accordingly, in such a case as described above, the block selector 520 may preferentially select the first block 630A as the victim block.

FIG. 7 illustrates a garbage collection operation in accordance with an embodiment of the present invention. Specifically, a method of counting a data read count (RC), which is a criterion for selecting a victim block, is illustrated in FIG. 7.

As described earlier, the processor 134 of FIG. 5 may read valid data of a victim block in order to the garbage collection operation. Such a read operation may be performed on a page unit. When invalid data exist in a specific page, the read operation may be sequentially performed just onto successive valid data.

For example, for a third block 730A, invalid data may be stored in a first chunk 730A_2 of a zeroth page, a first chunk 730A_5 of a first page, a zeroth chunk 730A_7 of a second page, and a first chunk 730A_11 of a third page. Accordingly, in order to perform the garbage collection operation for the third block 730A, the processor 134 may read valid data of a zeroth chunk 730A_1 of the zeroth page, and subsequently read valid data of a second chunk 730A_3 of the zeroth page. Similarly, the processor 134 may read valid data of a zeroth chunk 730A_4 of the first page, and subsequently read valid data of a second chunk 730A_6 of the first page. On the other hand, the processor 134 may read valid data of first and second chunks 730A_8 and 730A_9 of the second page at a time. Subsequently, the processor 134 may read valid data of a zeroth chunk 730A_10 of the third page, and subsequently read valid data of a second chunk 730A_12 of the third page. Finally, the processor 134 may read valid data of each of zeroth to second chunks 730A_13 to 730A_15 of a fourth page at a time. Consequently, the processor 134 may perform the read operation seven times, which corresponds to 730A_1, 730A_4, 730A_6, 730A_8, 730A_9, 730A_10 and 730A_12 to 730A_15. The counter 520 may count an RC of the third block 730A as 8.

Meanwhile, for a fourth block 730B, invalid data may be stored in a zeroth to second chunks 730B_4 to 730B_6 of a first page and a zeroth chunk 730B_7 of a second page. Accordingly, in order to perform the garbage collection operation for the fourth block 730B, the processor 134 may read valid data of zeroth to second chunks 730B_1 to 730B_3 of a zeroth page. Also, the processor 134 may read valid data of first and second chunks 730B_8 and 730B_9 of the second page at a time. The processor 134 may read valid data of zeroth to second chunks 730B_10 to 730B_12 of a third page at a time. Finally, the processor 134 may read valid data of each of zeroth to second chunks 730B_13 to 730B_15 of a fourth page at a time. Consequently, the processor 134 may perform the read operation four times, which corresponds to 730B_1 to 730B_3, 730B_8, 730B_9, 730B_10 to 730B_12 and 730B_13 to 730B_15. The counter 520 may count an RC of the fourth block 730B as 4.

When a plurality of second candidate blocks exist, that is, a plurality of blocks having the same WC exist, the block selector 520 of FIG. 5 may select a block having the smallest RC among the second candidate blocks as a victim block. Accordingly, in such a case as described above, the block selector 520 may preferentially select the fourth block 730B as the victim block. Consequently, the processor 134 may control the memory device 150 to read the valid data from the fourth block 730B which is selected as the victim block and program the valid data into a target block 750.

Figure 8:
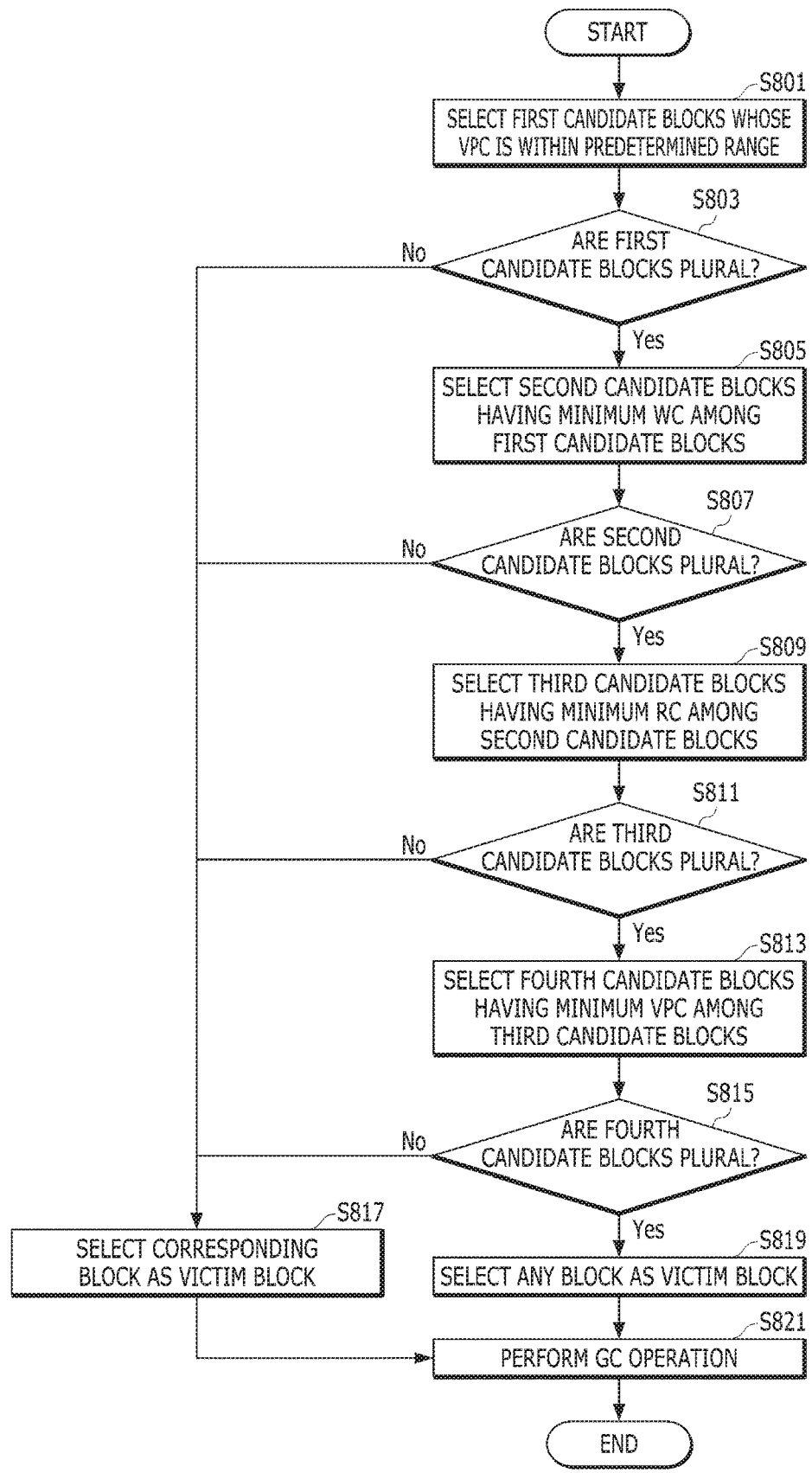
FIG. 8 is a flowchart illustrating an operation of a controller in accordance with an embodiment of the present invention.

FIG. 8 is a flowchart illustrating an operation of the controller 130 of FIG. 5 in accordance with an embodiment of the present invention.

At step S801, the block selector 520 may select one or more first candidate blocks whose VPC is within a predetermined range.

When the number of the first candidate blocks is not plural, i.e., when the number of the first candidate blocks is one (that is, "NO" in step S803), the block selector 520 may select that first candidate block as a victim block at step S817.

When the number of the first candidate blocks is plural (that is, "YES" in step S803), the block selector 520 may select one or more second candidate blocks having a minimum WC among the first candidate blocks at step S805.

When the number of the second candidate blocks is not plural, i.e., when the number of the second candidate blocks is one (that is, "NO" in step S807), the block selector 520 may select that second candidate block as a victim block at step S817.

When the number of the second candidate blocks is plural (that is, "YES" in step S807), the block selector 520 may select one or more third candidate blocks having a minimum RC among the second candidate blocks at step S809.

When the number of the third candidate blocks is not plural, i.e., when the number of the third candidate blocks is one (that is, "NO" in step S811), the block selector 520 may select that third candidate block as a victim block at step S817.

When the number of the third candidate blocks is plural (that is, "YES" in step S811), the block selector 520 may select one or more fourth candidate blocks having a minimum VPC among the third candidate blocks at step S813.

When the number of the fourth candidate blocks is not plural, i.e., when the number of the fourth candidate blocks is one (that is, "NO" in step S815), the block selector 520 may select that fourth candidate block as a victim block at step S817.

When the number of the fourth candidate blocks is plural (that is, "YES" in step S815), the block selector 520 may select any block of the fourth candidate blocks as a victim block at step S819.

The processor 134 may control the memory device 150 to perform the garbage collection operation for the selected victim block at step S821.

As described above, in accordance with embodiments of the present invention, a victim block may be more efficiently selected based on the amount of being programmed and read, rather than merely based on the number of valid pages.

FIGS. 9 to 17 are diagrams schematically illustrating application examples of the data processing system of FIGS. 1 to 8 according to various embodiments.

Figure 9:
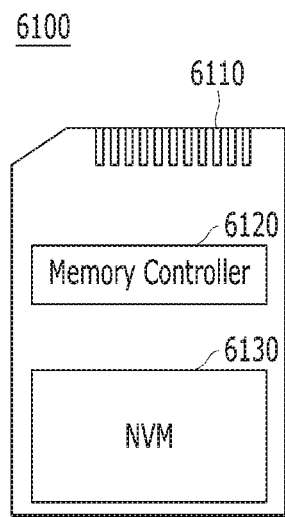
FIGS. 9 to 17 are diagrams schematically illustrating application examples of a data processing system, in accordance with various embodiments of the present invention.

FIG. 9 is a diagram schematically illustrating an example of the data processing system including the memory system in accordance with an embodiment. FIG. 9 schematically illustrates a memory card system to which the memory system may be applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 8, and the memory device 6130 may correspond to the memory device 150 of the memory system 110 described with reference to FIGS. 1 to 8.

Thus, the memory controller 6120 may include a RAM, a processor, a host interface, a memory interface and an error correction component. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (ST-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may be integrated to form a solid state driver (SSD). Also, the memory controller 6120 and the memory device 6130 may form a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and/or a universal flash storage (UFS).

Figure 10:
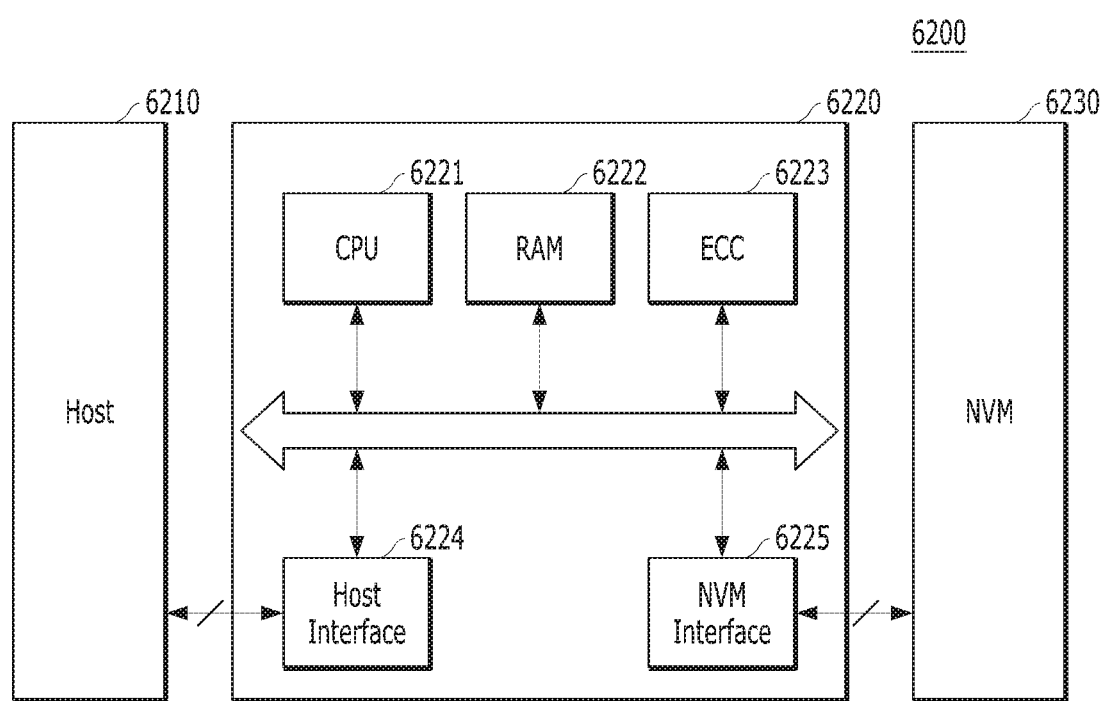

FIG. 10 is a diagram schematically illustrating another example of the data processing system including a memory system, in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, microSD or the like) or USB device, as described with reference to FIG. 1. The memory device 6230 may correspond to the memory device 150 in the memory system 110 described in FIGS. 1 to 8, and the memory controller 6220 may correspond to the controller 130 in the memory system 110 described in FIGS. 1 to 8.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations for the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe, or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices, particularly a mobile electronic device.

Figure 11:
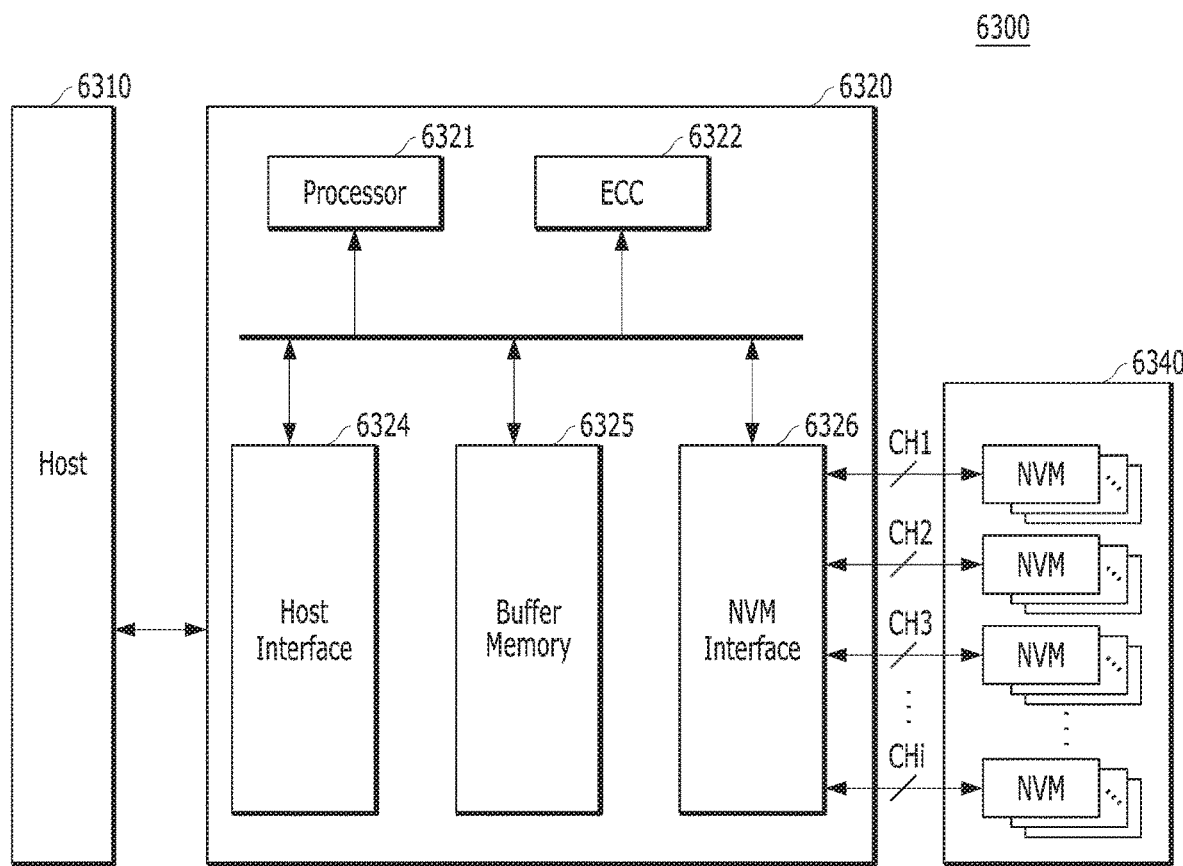

FIG. 11 is a diagram schematically illustrating another example of the data processing system including the memory system in accordance with an embodiment. FIG. 11 schematically illustrates an SSD to which the memory system may be applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
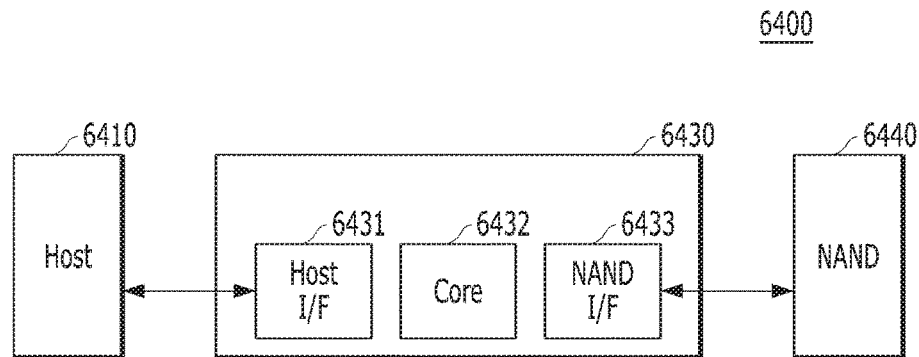
Figure 13:
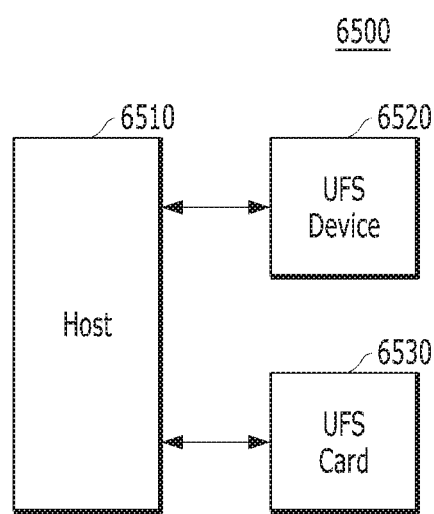
Figure 14:
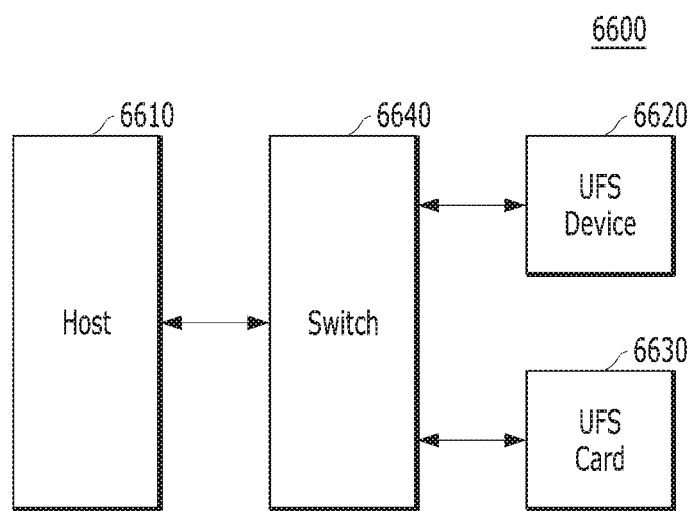
Figure 15:
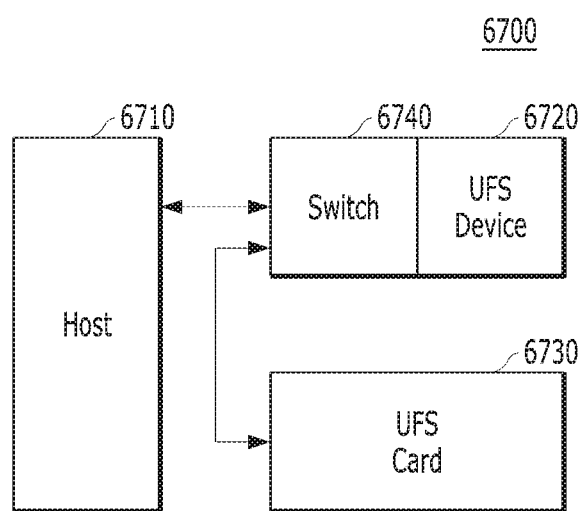
Figure 16:
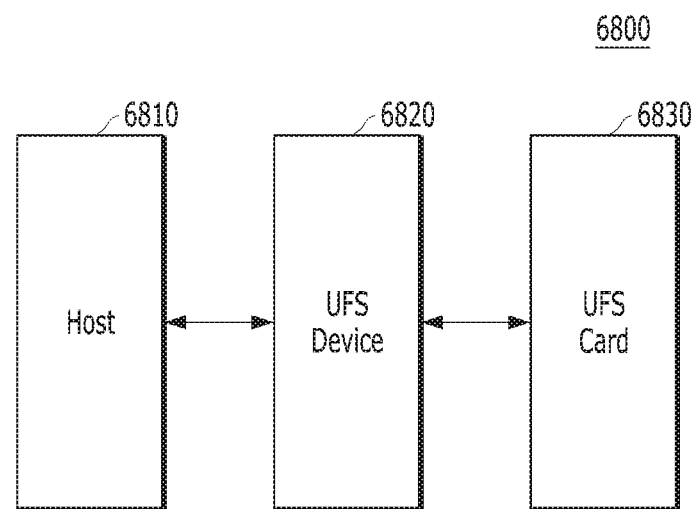

FIG. 12 is a diagram schematically illustrating another example of the data processing system including the memory system in accordance with an embodiment. FIG. 12 schematically illustrates an embedded Multi-Media Card (eMMC) to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with one or more embodiments. FIGS. 13 to 16 schematically illustrate UFS (Universal Flash Storage) systems to which the memory system may be applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and microSD.

Figure 17:
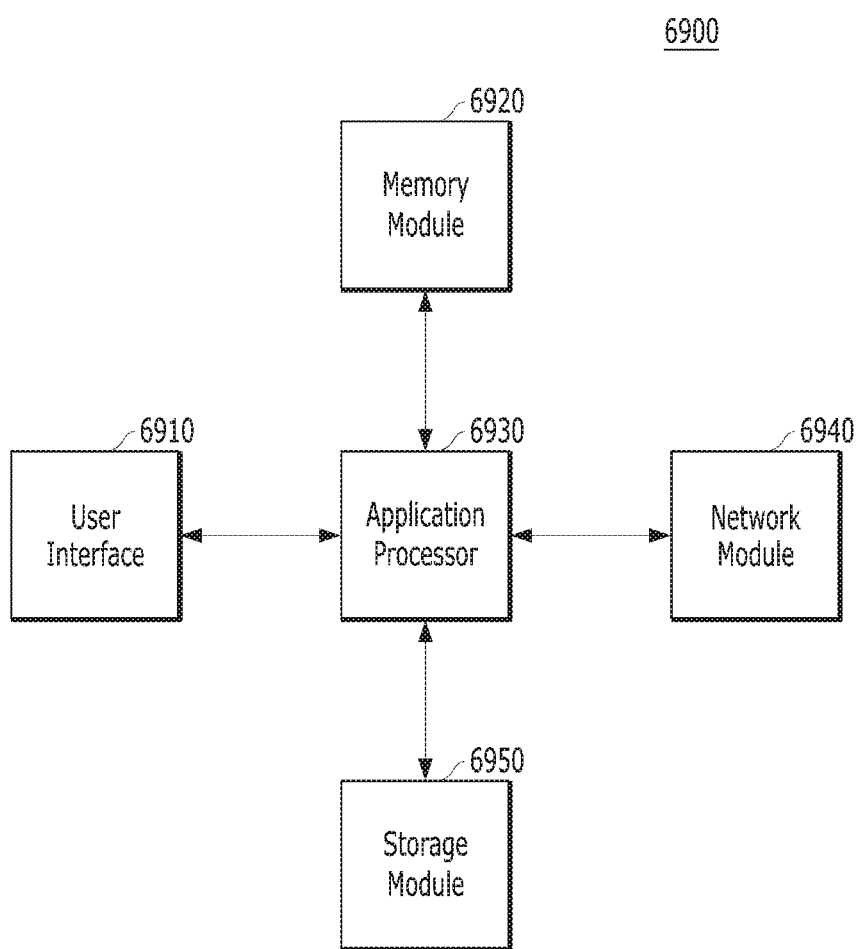

FIG. 17 is a diagram schematically illustrating another example of the data processing system including the memory system in accordance with an embodiment. FIG. 17 is a diagram schematically illustrating a user system to which the memory system may be applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art in light of this disclosure that various changes and modifications may be made without departing from the spirit and scope of the invention as defined by the following claims.

What is claimed is:

1. A controller comprising:
   a block selector suitable for:
      selecting one or more first candidate blocks, a first parameter value of each of which is within a predetermined range;
      selecting, among the one or more first candidate blocks, one or more second candidate blocks, a second parameter value of each of which is a minimum value, if a number of the one or more first candidate blocks is greater than or equal to two; and
      detecting a second candidate block as a victim block if a number of the one or more second candidate blocks is one; and
   a processor suitable for controlling a memory device to read valid data stored in the victim block and program the valid data into a target block in the memory device,
   wherein each first parameter value represents a number of valid pages in each of a plurality of blocks in the memory device, and
   wherein each second parameter value represents a number of times that valid data stored in each of the one or more first candidate blocks are programmed into the target block.

2. The controller of claim 1, wherein if the number of the one or more second candidate blocks is greater than or equal to two, the block selector selects, among the second candidate blocks, one or more third candidate blocks, a third parameter value of each of which is a minimum value,
   wherein if a number of the one or more third candidate blocks is one, the block selector detects a third candidate block as the victim block, and
   wherein each third parameter represents a number of times that valid data stored in each of the one or more second candidate blocks are read.

3. The controller of claim 2, wherein if the number of the one or more third candidate blocks is greater than or equal to two, the block selector selects, among the third candidate blocks, one or more fourth candidate blocks, the first parameter value of each of which is a minimum value, and
   wherein if a number of the one or more fourth candidate blocks is one, the block selector detects a fourth candidate block as the victim block.

4. The controller of claim 1, wherein if the number of the one or more first candidate blocks is one, the block selector selects a first candidate block as the victim block.

5. The controller of claim 1, wherein the processor controls the memory device to perform an erase operation on the victim block.

6. The controller of claim 1, wherein the processor controls the memory device to perform a program operation on a page unit of the target block.

7. The controller of claim 6, wherein the processor controls the memory device to program dummy data into a chunk of the target block which is not programmed, during the program operation.

8. The controller of claim 7, wherein the processor controls the memory device to sequentially read the valid data stored in the victim block.

9. The controller of claim 8, further comprising:
   a cache memory suitable for storing the read valid data.

10. An operating method of a controller, comprising:
    selecting one or more first candidate blocks, a first parameter value of each of which is within a predetermined range;
    selecting, among the one or more first candidate blocks, one or more second candidate blocks, a second parameter of each of which is a minimum value, if a number of the one or more first candidate blocks is greater than or equal to two;
    detecting a second candidate as a victim block if a number of the one or more second candidate blocks is one;
    reading valid data stored in the victim block; and
    programming the valid data into a target block,
    wherein each first parameter value represents a number of valid pages in each of a plurality of blocks in a memory device, and
    wherein each second parameter value represents a number of times that valid data stored in each of the one or more first candidate blocks are programmed into the target block.

11. The operating method of claim 10, further comprising:
    selecting, among the one or more second candidate blocks, one or more third candidate blocks, a third parameter of each of which is a minimum value, if the number of the one or more second candidate blocks is greater than or equal to two; and
    detecting a third candidate block as the victim block if a number of the one or more third candidate blocks is one,
    wherein the third parameter represents a number of times that valid data stored in each of the one or more second candidate blocks are read.

12. The operating method of claim 11, further comprising:
    selecting, among the one or more third candidate blocks, one or more fourth candidate blocks, the first parameter of each of which has a minimum value, if the number of the one or more third candidate blocks is greater than or equal to two; and detecting a fourth candidate block as the victim block if a number of the one or more fourth candidate blocks is one.

13. The operating method of claim 10, further comprising selecting a first candidate block as the victim block if the number of the one or more first candidate blocks is one.

14. The operating method of claim 10, further comprising performing an erase operation on the victim block.

15. The operating method of claim 10, wherein the programming of the valid data is carried out to perform a program operation on a page unit of the target block.

16. The operating method of claim 15, wherein the programming of the valid data is carried out to program dummy data for a chunk of the target block which is not programmed, during the program operation.

17. The operating method of claim 10, wherein the reading of the valid data is carried out to sequentially read the valid data stored in the victim block.

18. The operating method of claim 17, further comprising: storing the read valid data into a cache memory.

\* \* \* \* \*